United States Patent [19]

Lowther

[11] 4,326,483
[45] Apr. 27, 1982

[54] INTERNAL COMBUSTION ENGINE WITH OXIDANT MANUFACTURE

[75] Inventor: Frank E. Lowther, Buffalo, N.Y.

[73] Assignee: Purification Sciences, Inc., Geneva, N.Y.

[21] Appl. No.: 140,765

[22] Filed: Apr. 16, 1980

[51] Int. Cl.³ .............................................. F02B 43/08
[52] U.S. Cl. ...................................... 123/3; 123/1 A; 60/39.46 R
[58] Field of Search .................... 123/3, 1 A, 568, 571, 123/569; 60/39.46 R, 39.46 S, 39.46 G; 423/391, 396

[56] References Cited

U.S. PATENT DOCUMENTS

| | | | |
|---|---|---|---|
| 2,720,856 | 10/1955 | Hoke, Jr. | 123/568 |
| 3,459,953 | 8/1969 | Hughes et al. | 123/3 |
| 3,559,402 | 2/1971 | Stone et al. | 123/569 |
| 3,658,043 | 4/1972 | Hoffman | 123/3 |
| 3,702,110 | 11/1972 | Hoffman et al. | 123/568 |
| 3,709,203 | 1/1973 | Cettin et al. | 123/571 |
| 3,775,976 | 12/1973 | Karig | 123/568 |
| 3,828,736 | 8/1974 | Koch | 123/3 |
| 3,877,447 | 10/1955 | Ross, Sr. | 123/3 |
| 4,147,025 | 4/1979 | Friedrich et al. | 60/39.46 R |

OTHER PUBLICATIONS

Sutton et al., *Rocket Propulsion Elements*, "Nitric Acid" ($HNO_3$), pp. 247–248, 10-8-76 (Location Au. 343).
Kirk–Othmer, *Encyclopedia of Chemical Technology*, "Nitric Acid", 2nd edition, pp. 800–802, vol. 13, 1969.
Mellor, *Modern Inorganic Chemistry*, "Compounds of Nitrogen and Hydrogen", Chap. 28, pp. 533–535.

Primary Examiner—Charles J. Myhre
Assistant Examiner—E. Rollins Cross
Attorney, Agent, or Firm—Robert J. Bird

[57] ABSTRACT

Certain applications of liquid fuel, storable liquid oxidant internal combustion engines require the oxidant to be formed as needed and that only minimal amounts of oxidant need be stored.

3 Claims, 2 Drawing Figures

INTERNAL COMBUSTION ENGINE WITH OXIDANT MANUFACTURE

BACKGROUND OF THE INVENTION

Certain advantages exist for an internal combustion engine that uses a storable liquid oxidant in place of the ambient atmosphere as a source of oxygen to combust the fuel. In such a case, two storage tanks are required, one for the fuel and one for the oxidant. The two storage tank requirement may be inconvenient in certain applications, submarine service, for example. The present invention includes methods and apparatus wherein the liquid oxidant is formed locally from air, water, exhaust and energy.

Prior Art Description

Closed cycles in terms of exhaust products have been proposed for gaseous oxidant internal combustion engines. U.S. Pat. No. 3,559,402, titled *Closed Cycle Diesel Engine* by W. J. Stone is an example. The engine is not closed in terms of oxidant, since liquid oxygen is introduced from external sources and vaporized prior to entry into the engine cylinder. A storage tank somewhere is required to hold the liquid oxygen unless a cryogenic plant generates the liquid oxygen exactly as needed (which seems unlikely), but this is not specified as such.

Additional non-air breathing internal combustion engines all appear to specify a tank to hold the oxygen containing oxidant. Examples include the following U.S. Pat. Nos.:

2,720,856 Hoke;
3,709,203 Cettin;
3,775,976 Karig;
4,047,380 Heffernan;
4,091,769 Baldwin.

SUMMARY OF THE INVENTION

The present invention includes methods and apparatus wherein storable liquid oxidants for use in internal combustion engines are manufactured locally, essentially as needed. Small amounts may be stored for starting periods and the like.

It is an object of this invention to require only the storage of fuel and water for an internal combustion engine that uses a storable (non-cryogenic) liquid oxidant to combust the fuel.

It is another object of this invention to locally manufacture the liquid oxidant from locally available raw materials: air, water, exhaust products from the engine, and energy. The energy may come from a stored source such as an electric battery, or may be generated by the engine itself (i.e., a motor driven electric generator).

These and other objects and features of the invention will be apparent to a skilled scientist by reference to the following description and drawings.

DETAILED DESCRIPTION

Figure 1:
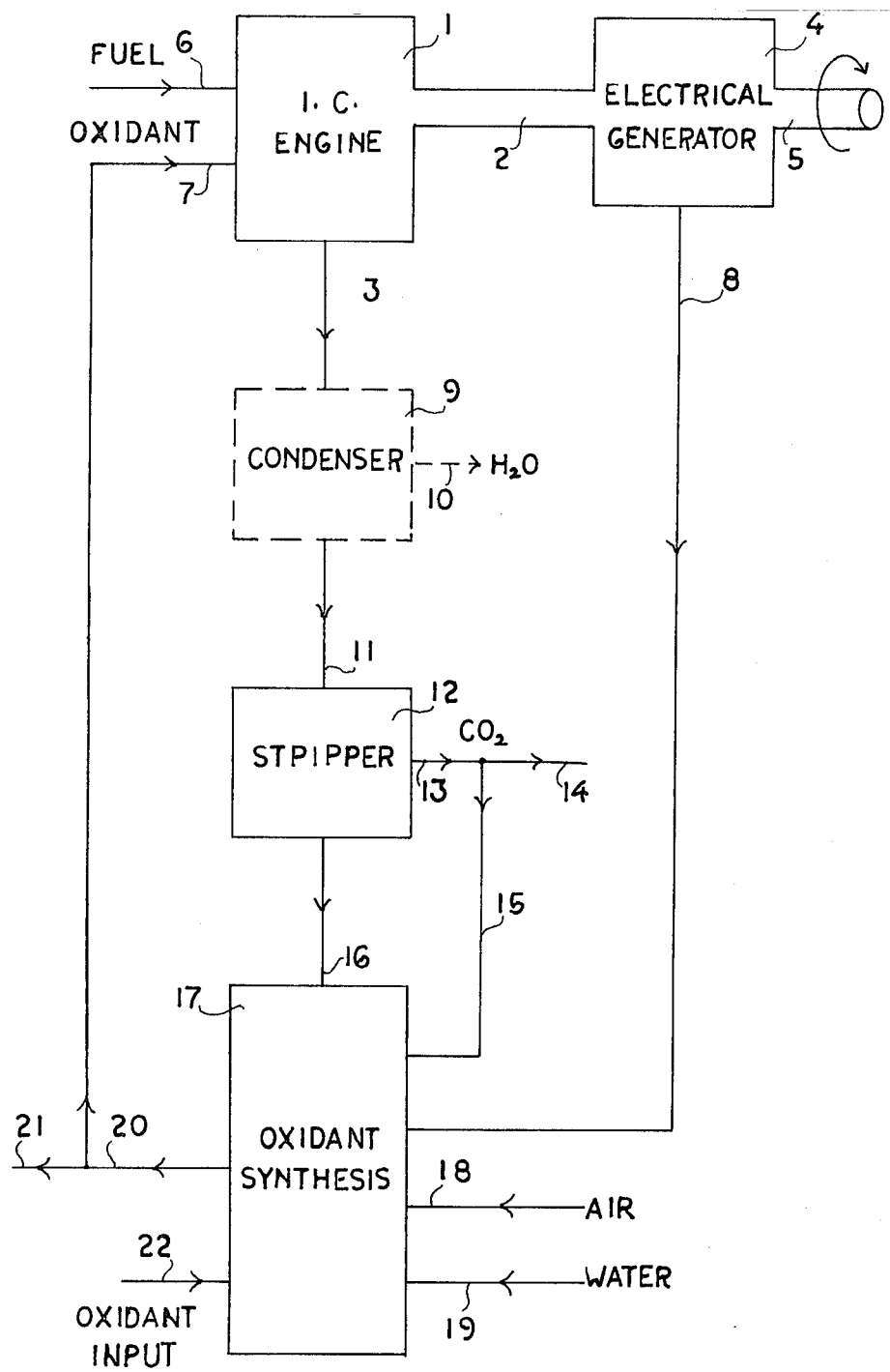
FIG. 1 illustrates, in diagramatic form, the principles of the present invention.

FIG. 1 is a part schematic and part functional diagram illustrating the basic concept of the present invention. Internal combustion engine 1 is structured to operate on liquid fuel 6 and liquid (storable at normal temperatures) oxidant 7 and includes output shaft 2, 5 which drives electrical generator 4 inbetween. The output work shaft is shown as 5. The exhaust gases 3 from engine 1 pass through a condenser 9 that extracts water through line 10. The condenser 9 is no more elaborate than a water-driven heat exchanger that cools the engine exhaust 3 to less than 212° F. Condenser 9 is shown as dotted, as in some applications it may be desirable to keep the exhaust moisture in vapor form. The exhaust gases pass from condenser 9 to carbon dioxide stripper 12 via pipe 11. The carbon dioxide free exhaust gases pass from stripper 12 to oxidant synthesis unit 17 via pipe 16. The carbon dioxide leaves stripper 12 via pipe 13 and a portion is wasted via pipe 14 and a portion is passed to the oxidant synthesis unit 17 via pipe 15. Electricity from the generator 4 may be conducted for use in the oxidant synthesis unit 17 by electrical conductor 8. Ambient air 18 and water 19 may be used in oxidant synthesis unit 17. A portion of water 19 may be condensed water 10 out of condenser 9. A small amount of oxidant manufactured elsewhere 22 may be needed for priming and/or starting purposes. and to assure a smooth and continuous operation. The oxidant storage capacity in oxidant synthesis unit 17 is small and is not to be construed to be a main storage tank. Typically, one gallon of oxidant may be stored in the oxidant synthesis unit 17. The manufactured liquid oxidant leaves the synthesis unit 17 via pipe 20. A portion of the manufactured oxidant enters engine 1 via pipe 7 and an excess may be manufactured for other purposes and is tapped off at pipe 21.

Figure 2:
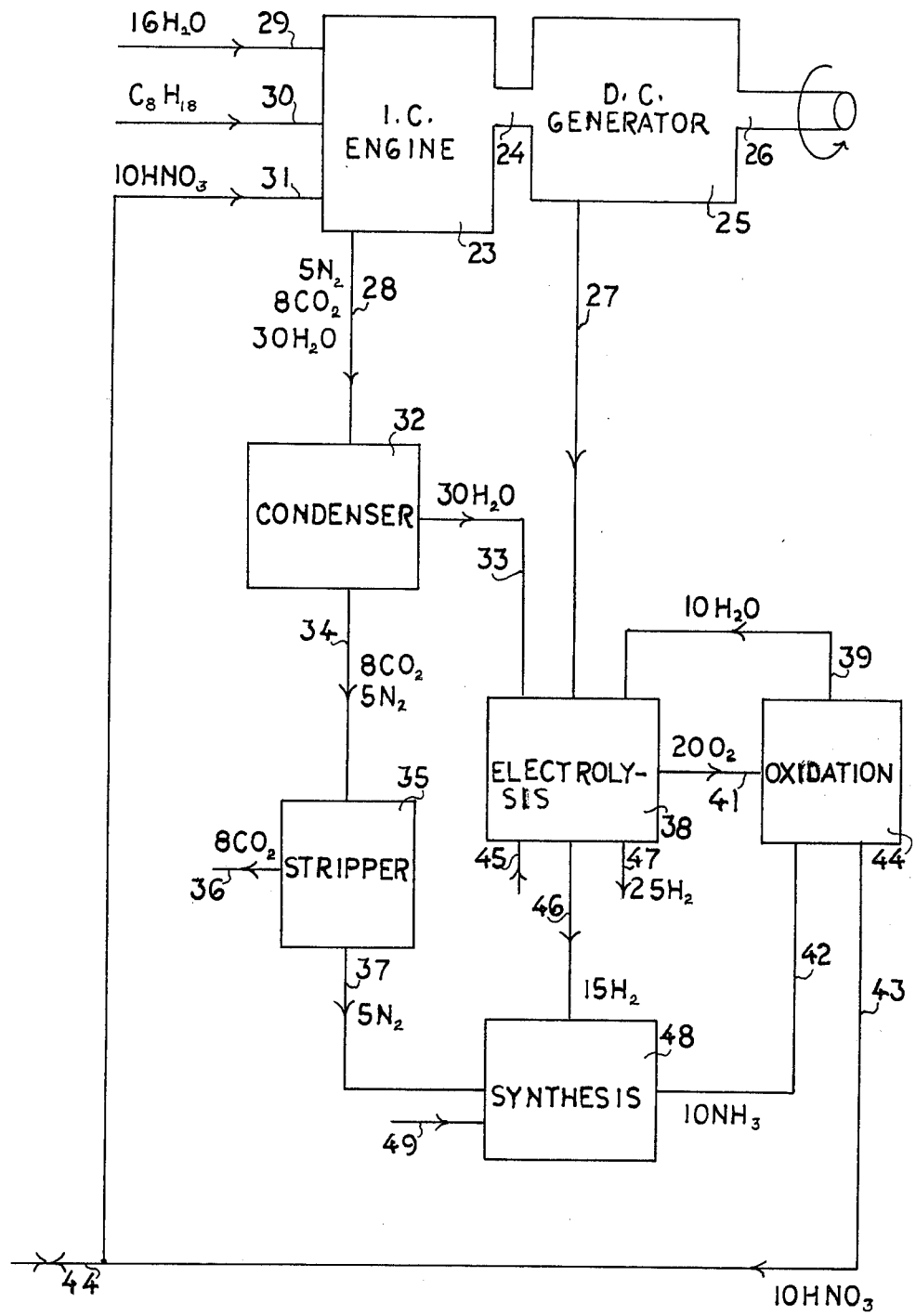
FIG. 2 is a specific embodiment of the present invention.

FIG. 2 is a specific embodiment of the present invention wherein the liquid oxidant manufactured is nitric acid, $HNO_3$. The accompanying chart presents the governing mass balance equations. Auxiliary equipment that will be required for starting and other usual housekeeping functions is not shown in either FIG. 1 or FIG. 2. For example, the electrical generator in FIGS. 1 and 2 may be used to maintain a charge in an electric battery which, in turn, is keyed to drive a starting motor via the ignition switch. Additionally, electric driven pumps powered by the starting battery may be used to move around the various liquids, drive compressors for the $CO_2$ stripper, etc. These housekeeping functions are not considered to be essential in the understanding of the present invention.

Internal combustion engine 23 in FIG. 2 includes an output mechanical shaft 24 which drives electrical D.C. generator 25 which, in turn, includes an output shaft 26 which is merely an extension of shaft 24. The exhaust 28 from engine 23 contains nitrogen, carbon dioxide, and water, all in the gaseous state. Condenser 32 condenses out water and feeds the same to an electrolysis unit 38 via pipe 33. Water-free exhaust gases leave condenser 32 via pipe 34 and enter carbon dioxide stripper 35. Carbon dioxide stripper 35 may be of any of the standard commercial types made possible by the high solubility of carbon dioxide in water and/or the ease with which carbon dioxide may be solidified. In the present invention, the removed carbon dioxide 36 is not used and is shown as being wasted. In another embodiment, it may be useful to utilize the carbon dioxide 36 as a coolant to the engine or as a dilutant in place of a portion of the water 29 if said carbon dioxide 36 is available in solid (dry ice) form.

The electrolysis unit 38 receives electrical energy 27 and water 33, 39, 45 where 45 may represent an outside source of water. Electrolysis unit 38 supplies gaseous oxygen 41 to ammonia oxidation unit 44, hydrogen gas 46 to ammonia synthesis unit 48, and waste hydrogen 47. The gaseous output 37 from stripper 35 is essentially nitrogen 37. Ammonia synthesis unit 48 may receive additional nitrogen 49 from an external source such as the ambient atmosphere or from the snorkel tube in a submarine. Ammonia synthesis unit 48 may contain catalysts, heaters, compressors, and similar devices to implement the synthesis process required, i.e., ammonia from gaseous nitrogen and gaseous hydrogen. Ammonia from synthesis device 48 passes to the oxidation device 44 via pipe 42. The oxidation device 44 takes in oxygen 41 and ammonia 42 and gives off water 39 and nitric acid 43. Oxidation device 44 may contain catalysts, heaters, compressors, and similar auxiliary devices needed to oxidize ammonia to nitric acid. Nitric acid leaving in pipe 43 enters engine 23 via pipe 31 with capability for tap-off or injection of nitric acid at 44. Waste hydrogen 47 may be used to fuel a secondary engine (not shown) or simply wasted. Dilutant water 29 enters engine 23 along with gasoline fuel 30. A dryer stage is needed in oxidation unit 44 to separate the nitric acid 43 from the water 39 that is formed.

Improvements in present day water electrolysis efficiency capability will be required to make the embodiment of FIG. 2 economically attractive. One modification to FIG. 2 will reduce the importance of water electrolysis efficiency. FIG. 2 shows 40 water molecules feeding the electrolysis unit with 25 hydrogen molecules (50 hydrogen atoms) being wasted. If the water feed is reduced from 40 to 15 molecules, then zero hydrogen is wasted, but now a net deficit of oxygen exists for the ammonia oxidation 44. The oxygen deficit can be made up by ambient air, stored oxygen, etc. In this case, the entire point of the embodiment is to convert either gaseous oxygen or cryogenic oxygen into a storable liquid oxidant suitable for the combustion process.

Present day commercial water electrolysis units produce oxygen at about 3.5 KWH per pound of oxygen produced where the theoretical thermodynamic value is about 1.8 KWH per pound at 25° C.

Of course, other energy types may be used in the reforming process. For example, the engine driven electric generator may drive a corona reactor which, it is known, can form nitric acid, hydrogen peroxide, or ozone from air. These three chemicals may all be suitable.

Relations Describing Process of FIG. 2

| Inputs | Waste | Intermediates |
| --- | --- | --- |
| $C_8H_{18}$ (1 gr.) | $8CO_2$ (3.09 gr.) | $N_2$ (1.23 gr.) |
| $16H_2O$ (2.53 gr.) | $25H_2$ (0.44 gr.) | $20O_2$ (5.61 gr.) |
|  |  | $15H_2$ (0.26 gr.) |
|  |  | $10NH_3$ (1.49 gr.) |
|  |  | $10HNO_3$ (5.53 gr.) |

Combustion Equation $$C_8H_{18} + 10HNO_3 + 16H_2O \rightarrow 5N_2 + 8CO_2 + 30H_2O$$

Electrolysis $$40H_2O \rightarrow (15H_2 + 20O_2) + 25H_2 \uparrow$$

Reforming $$5N_2 + 15H_2 \rightarrow 10NH_3$$

$$10NH_3 + 20O_2 \rightarrow 10HNO_3 + 10H_2O$$

What is claimed is:
1. An internal combustion engine system including:
 (a) an internal combustion engine in which fuel is combusted with concentrated oxidant to generate power and a mixture of combustion products including nitrogen, carbon dioxide, and water vapor,
 (b) means to remove water from said combustion products,
 (c) means to remove carbon dioxide from said combustion products,
 (d) electrolysis means to decompose said water to produce hydrogen and oxygen,
 (e) synthesis means to combine nitrogen from said combustion products with said hydrogen to produce ammonia,
 (f) oxidation means to combine said ammonia with said oxygen to produce nitric acid, and
 (g) means to return said nitric acid to said engine for repeated use as oxidant to support combustion.
2. An internal combustion engine system as defined in claim 1 further including:
 (h) means to supply make-up nitrogen to said synthesis means.
3. An internal combustion engine system as defined in claim 2, further including:
 (i) means to supply make-up water to said electrolysis means.

* * * * *